United States Patent
Kim

(10) Patent No.: US 9,363,647 B2
(45) Date of Patent: Jun. 7, 2016

(54) APPARATUS AND METHOD FOR RUNNING CAR APPLICATION CONNECTED TO MOBILE DEVICE

(71) Applicant: Samsung Electronics Co., Ltd., Gyeonggi-do (KR)

(72) Inventor: Sang-Don Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 21 days.

(21) Appl. No.: 14/011,411

(22) Filed: Aug. 27, 2013

(65) Prior Publication Data

US 2014/0073308 A1    Mar. 13, 2014

(30) Foreign Application Priority Data

Sep. 7, 2012  (KR) .......... 10-2012-0099072

(51) Int. Cl.
 *H04W 4/04* (2009.01)
(52) U.S. Cl.
 CPC .................... *H04W 4/046* (2013.01)
(58) Field of Classification Search
 CPC ..... H02J 7/025; H02J 5/005; H02J 2007/005; H02J 2007/0049
 USPC .......... 455/550.1, 343.1, 557, 41.2, 572, 455/556.1; 701/1; 705/34
 See application file for complete search history.

(56) References Cited

U.S. PATENT DOCUMENTS

| | | | |
|---|---|---|---|
| 8,069,100 B2* | 11/2011 | Taylor et al. | 705/34 |
| 2003/0228879 A1* | 12/2003 | Witkowski et al. | 455/550.1 |
| 2004/0254690 A1* | 12/2004 | Hasegawa et al. | 701/1 |
| 2008/0014897 A1* | 1/2008 | Cook et al. | 455/343.1 |
| 2011/0098087 A1* | 4/2011 | Tseng | 455/557 |
| 2012/0071096 A1* | 3/2012 | Matsushita et al. | 455/41.2 |
| 2012/0184338 A1* | 7/2012 | Kesler et al. | 455/572 |

FOREIGN PATENT DOCUMENTS

KR   1020100109061   10/2010

* cited by examiner

*Primary Examiner* — Phuoc H Doan
(74) *Attorney, Agent, or Firm* — The Farrell Law Firm, P.C.

(57) ABSTRACT

A method of running a car application connected to a mobile device is provided. The method includes determining, by the mobile device, whether a wireless charging event occurs; determining, by the mobile device, whether the mobile device is located in a car, if the wireless charging event occurs; and running the car application if the mobile device is determined to be located in the car.

12 Claims, 7 Drawing Sheets

APPARATUS AND METHOD FOR RUNNING CAR APPLICATION CONNECTED TO MOBILE DEVICE

PRIORITY

This application claims priority under 35 U.S.C. §119(a) to a Korean Patent Application filed in the Korean Intellectual Property Office on Sep. 7, 2012, and assigned Serial No. 10-2012-0099072, the entire disclosure of which is incorporated herein by reference, in its entirety.

BACKGROUND OF THE INVENTION

1. Field of the Invention

The present invention relates generally to running a car application, and more particularly, to an apparatus and method for running a car application connected to a mobile device.

2. Description of the Related Art

Cars generally support communication between various information and communication devices, such as car diagnostic devices, Personal Digital Assistants (PDAs), laptops, etc. and a car network. Cars may be connected to information and communication devices and an Electronic Control Unit (ECU) that makes up the car network using a communication protocol, such as Controller Area Network (CAN) (International Standardization Organization (ISO) 1158), Universal Asynchronous Receiver/Transmitter (UART), Society of Automotive Engineers (SAE) J1850, etc. Specifically, cars that include car gateways are directly connected to information and communication devices using the car gateways, or are connected to them via Ethernet switches, Wireless Local Area Network (WLAN), Access Points (APs), etc. in Peer to Peer (P2P) schemes.

Also, as various wireless communication schemes, such as Universal Mobile Telecommunications System (UMTS), Code Division Multiple Access (CDMA), Wireless Broadband (WiBro, a type of mobile Worldwide Interoperability for Microwave Access (WiMAX)), WLAN, Wireless Personal Area Network (WPAN), Wireless Fidelity (Wi-Fi), Bluetooth communications, etc. have emerged, information and communication devices communicate with the car network using the various wireless communication schemes and attempt to provide integrated services based on car information obtained from the car network.

Accordingly, development has recently been under way on car software such as, for example, car applications that provide many different car-related services using car information obtained from the car network. For example, a technology has been developed to connect cars and mobile devices to enable drivers to use location information and voice navigation, make calls and send text messages, and listen to music and the like through a car application while driving.

To run a car application, the user has to first connect the mobile device and a head unit of the car via e.g., Universal Serial Bus (USB) and then manipulate the mobile device to run the car application, causing some inconvenience to the user.

Thus, it would be more convenient if communication between a car and a mobile device is automatically established and a car application also runs automatically without user intervention.

Furthermore, since recent cars are equipped with functionality for wirelessly charging a mobile device, it would be much more convenient if a car application takes into account wireless charging of the mobile device while the application runs.

SUMMARY OF THE INVENTION

The present invention has been made to address at least the problems and disadvantages described above, and to provide at least the advantages described below. Accordingly, aspects of the present invention provide an apparatus and method for running a car application connected to a mobile device, by which communication between the car and the mobile device is automatically established.

An aspect of the present invention is to provide an apparatus and method for running a car application connected to a mobile device, by which the car application is automatically run when communication is established between the car and the mobile device.

Yet another aspect of the present invention is to provide an apparatus and method for running a car application connected to a mobile device, by which the car application is automatically run when wireless charging begins between the car and the mobile device.

In accordance with an aspect of the present invention, a method of running a car application connected to a mobile device is provided, the method including determining, at a mobile device, whether a wireless charging event occurs; determining at the mobile device whether the mobile device is located in a car, if the wireless charging event occurs; and running a car application if the mobile device is determined to be located in the car.

In accordance with another aspect of the present invention, a mobile device is provided, the mobile device including a wireless power receiver configured to receive wireless power and perform wireless charging; a short-range wireless communication unit configured to perform short-range wireless communication with a head unit of a car; and a controller configured to determine whether the mobile device is located in the car when a wireless charging event occurs and to run a car application if the mobile device is determined to be located in the car.

BRIEF DESCRIPTION OF THE DRAWINGS

The above and other aspects, features, and advantages of certain embodiments of the present invention will be more apparent from the following description taken in conjunction with the accompanying drawings in which.

DETAILED DESCRIPTION OF EMBODIMENTS OF THE PRESENT INVENTION

Figure 1:
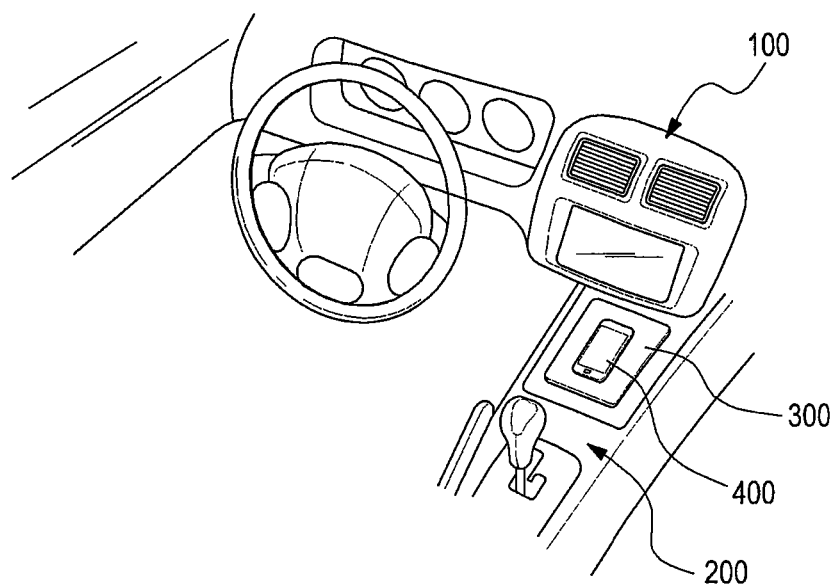
FIG. 1 illustrates the interior of a car with a mobile device, according to an embodiment of the present invention.

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness. Throughout the drawings, like reference numerals will be understood to refer to like parts, components, and structures.

The terms and words used in the following description and claims are not limited to their dictionary meanings, but, are merely used to enable a clear and consistent understanding of the invention. Accordingly, it should be apparent to those skilled in the art that the following description of embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In embodiments of the present invention, as will be described below, an apparatus and method for running a car application connected to a mobile device is provided, wherein the mobile device runs a car application automatically by determining if the mobile device is located in the car based on at least one of whether communication between the car and the mobile device is established and whether wireless charging of the mobile device begins.

FIG. 1 illustrates an interior of a car with a mobile device, according to an embodiment of the present invention. Referring to FIG. 1, a car includes a head unit 100 and a body 200. The body 200 performs various functionalities of the car, and the head unit 100 displays car information, which is obtained as a result of performing the functionalities, and plays radio, GPS, etc. The head unit 100 is connected to a mobile device 400 via a communication, and shares screen configuration and application functions through a car application. The head unit 100 may supply power to a wireless power transmitter 300 in the car. The wireless power transmitter 300 may be separate from the head unit 100 or may be incorporated with the head unit 100, and may be powered wirelessly from the body 200 through the head unit 100 and performs wireless power transmission.

The mobile device 400 may be connected to the head unit 100 for communication, and may be charged wirelessly by receiving wireless power from the wireless power transmitter 300. The mobile device 400 includes a car application, and runs the car application automatically if it determines that the mobile device 400 is located in the car based on whether connection between the head unit 100 and the mobile device 400 is made for communication and/or whether wireless charging begins in the mobile device 400.

Figure 2:
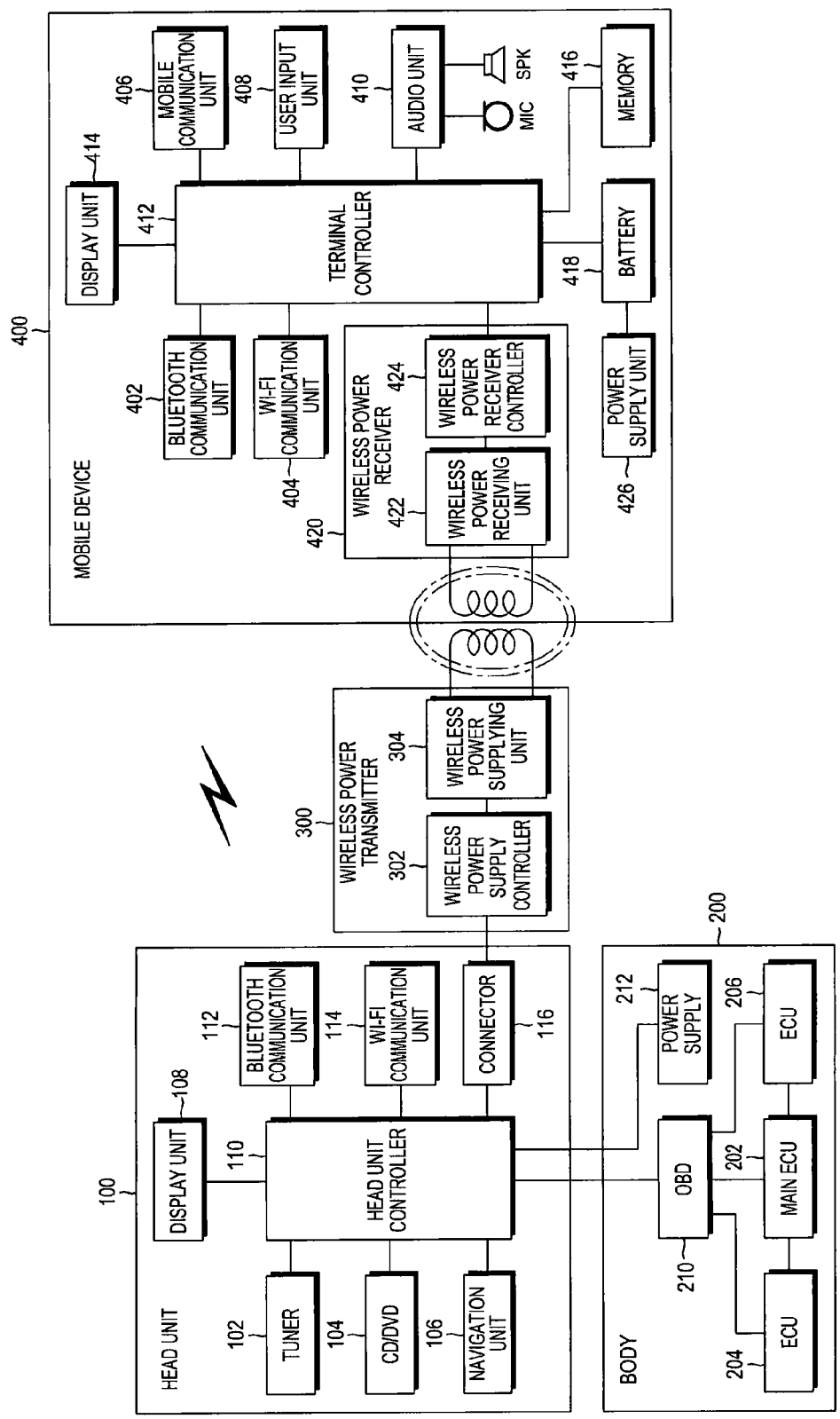
FIG. 2 illustrates block diagrams of a car's head unit and body, a wireless power transmitter, and a mobile device, according to an embodiment of the present invention.

FIG. 2 illustrates the head unit 100, the body 200, the wireless power transmitter 300, and the mobile device 400 in more detail.

The body 200 may include multiple Electric Control Units (ECUs) 202, 204, and 206, On-Board Diagnostics (OBD) 210, and a power supply 212. The ECUs 202, 204, and 206 are electronic control devices for controlling respective functional parts of the car, such as the car's power train, chassis, doors, and the like. In particular, it is possible for the main ECU 202 to control the other ECUs 204 and 206. The ECUs 202, 204, and 206 provide car information obtained as a result of performing each function of the car. The power supply 212 supplies power to every part of the car. The OBD 210, a car diagnosis unit, receives the car information from ECUs 202, 204, and 206, determines whether a fault has occurred in the car or whether the car operates correctly, and forwards the car information to the head unit 100.

The head unit 100 may include a tuner 102, a Compact Disc/Digital Versatile Disk (CD/DVD) player 104, a navigation unit 106, a display unit 108, a head unit controller 110, a Bluetooth communication unit 112, a Wireless Fidelity (Wi-Fi) communication unit 114, and a connector 116. The tuner 102 receives television or radio broadcast waves. The CD/DVD player 104 plays CDs and/or DVDs. The navigation unit 106 performs navigation functions. The display unit 108 outputs many different display data corresponding to the functionalities of the head unit 100. The head unit controller 110 controls general operations of the head unit 100, receives the car information from the OBD 210, controls the car information to be displayed in the display unit 108, and controls the car information to be forwarded to the mobile device 400 via communication. The Bluetooth communication unit 112 transmits to and receives from the mobile device 400 various signals and data using the Bluetooth protocol. The Wi-Fi communication unit 114 transmits to and receives from the mobile device 400 various signals and data using the Wi-Fi protocol. The connector 116 connects the head unit 100 to the wireless power transmitter 300 for power supply, and/or connects the head unit 100 to the mobile device 400 for providing data.

The wireless power transmitter 300 may be a contactless charging pad, including a wireless power supply controller 302 and a wireless power supplying unit 304. The wireless power supplying unit 304 transmits power by making its resonant coil resonate at the same frequency as a resonant coil of the mobile device 400. Although, in some embodiments of the present invention, the wireless power transmitter uses the resonance method, any other method, such as an electromagnetic induction method, Radio Frequency (RF)/microwave radiation method by which electric energy is converted to microwaves for transmission, etc. may also be used to transmit power to the mobile device 400.

The wireless power supply controller 302 controls general operations for supplying wireless power, and causes the mobile device 400 to be wirelessly charged by starting to supply wireless power when there is a request by the mobile device 400 for power supply or when the mobile device 400 comes within a predetermined distance from the wireless power transmitter 300.

The mobile device 400 includes a Bluetooth communication unit 402, a Wi-Fi communication unit 404, a mobile communication unit 406, a user input unit 408, an audio unit 410, a terminal controller 412, a display unit 414, a memory 416, a battery 418, a wireless power receiver 420, and a power supply unit 426.

The Bluetooth communication unit 402 transmits to and receives from the head unit 100 various signals and data using the Bluetooth protocol under control of the terminal controller 412. The Wi-Fi communication unit 404 transmits to and receives from the head unit 100 various signals and data using the Wi-Fi protocol under control of the terminal controller 412.

The mobile communication unit 406 connects the mobile device 400 to an external device through a mobile communication protocol using at least one antenna (not shown) under control of the terminal controller 412. The mobile communication unit 406 transmits/receives wireless signals for voice calls, video conference calls, Short Message Service (SMS) messages, and Multimedia Message Service (MMS) messages to/from a cell phone, a smart phone, a tablet PC, or any other device, the phones having phone numbers which be entered into the mobile device 400.

The user input unit 408 may include at least one of a plurality of buttons and a keypad, which may be arranged on the front, side, or back of the housing of the mobile device 400, and may include at least one of a power/lock button, a volume button, a menu button, a home button, a back button, and a search button. The keypad may receive key inputs from the user to control the mobile device 400. The keypad includes a mechanical keypad formed in the mobile device 400, or a virtual keypad displayed on the display unit 414, which may include a touchscreen. The mechanical keypad may be excluded depending on the performance or structure of the mobile device 400.

The audio unit 410 may reproduce digital audio files (e.g., files having extensions, such as mp3, wma, ogg, or way) stored or received under control of the terminal controller 412 and output resultant audio signals through a speaker (SPK). The audio unit 410 also converts voice signals input through a microphone (MIC) to digital audio data and provides the digital audio data to the terminal controller 412.

The terminal controller 412 controls general operations and components of the mobile device 400. The terminal controller 412 controls a car application causing it to run automatically by determining whether the mobile device 400 is located in the car based on whether connection between the car and the mobile device 400 is made for communication and/or whether wireless charging of the mobile device 400 begins.

The display unit 414 may include a display device, such as a Liquid Crystal Display (LCD), an Organic Electro Luminescence Display (OLED), etc., or a touch screen, and outputs many different display data under control of the terminal controller 412.

The memory 416 may store input/output signals or data that correspond to operations of the Bluetooth communication unit 402, the Wi-Fi communication unit 404, the mobile communication unit 406, the audio unit 410, and the display unit 414 under control of the terminal controller 412. The memory 416 may store control programs and applications for controlling the mobile device 400 or the terminal controller 412. Specifically, the memory 416 may store at least one car application that runs in connection with the car.

The wireless power receiver 420, equipped in the mobile device 400 or removably attached to the mobile device 400, includes a wireless power receiving unit 422 and a wireless power receiver controller 424. The wireless power receiving unit 422 receives supply power by making its resonant coil resonate to a resonant coil of the wireless power transmitter 300 at a same frequency. Although, in embodiments of the present invention, the wireless power receiver uses the resonance method, any other methods, such as an electromagnetic induction method, Radio Frequency (RF)/microwave radiation method by which electric energy is converted to microwaves for transmission, etc. may also be used.

The wireless power receiver controller 424 controls general operations for receiving wireless power, and causes the mobile device 300 to be wirelessly charged by receiving wireless power when a power supply start signal is received from the wireless power transmitter 300 or when the mobile device 400 comes within the predetermined distance from the wireless power transmitter 300.

The power supply unit 426 may supply power to one or more batteries 418 placed inside the housing of the mobile device 400 under control of the terminal controller 412. The one or more batteries 418 power the mobile device 400. The power supply unit 426 may charge the battery 418 by wirelessly receiving power supplied from the external wireless power transmitter 300 through the wireless power receiver 420.

A method of running a car application among the head unit 100, the body 200, the wireless power transmitter 300, and the mobile device 400 will now be described below.

In an embodiment, the mobile device 400 determines whether the mobile device 400 is located in the car by based on information included in a short-range wireless communication signal when at least one short-range wireless communication of the Wi-Fi communication and the Bluetooth communication is established between the mobile device 400 and the head unit 100. If the mobile device 400 is located in the car, the mobile device 400 runs a car application.

Figure 3:
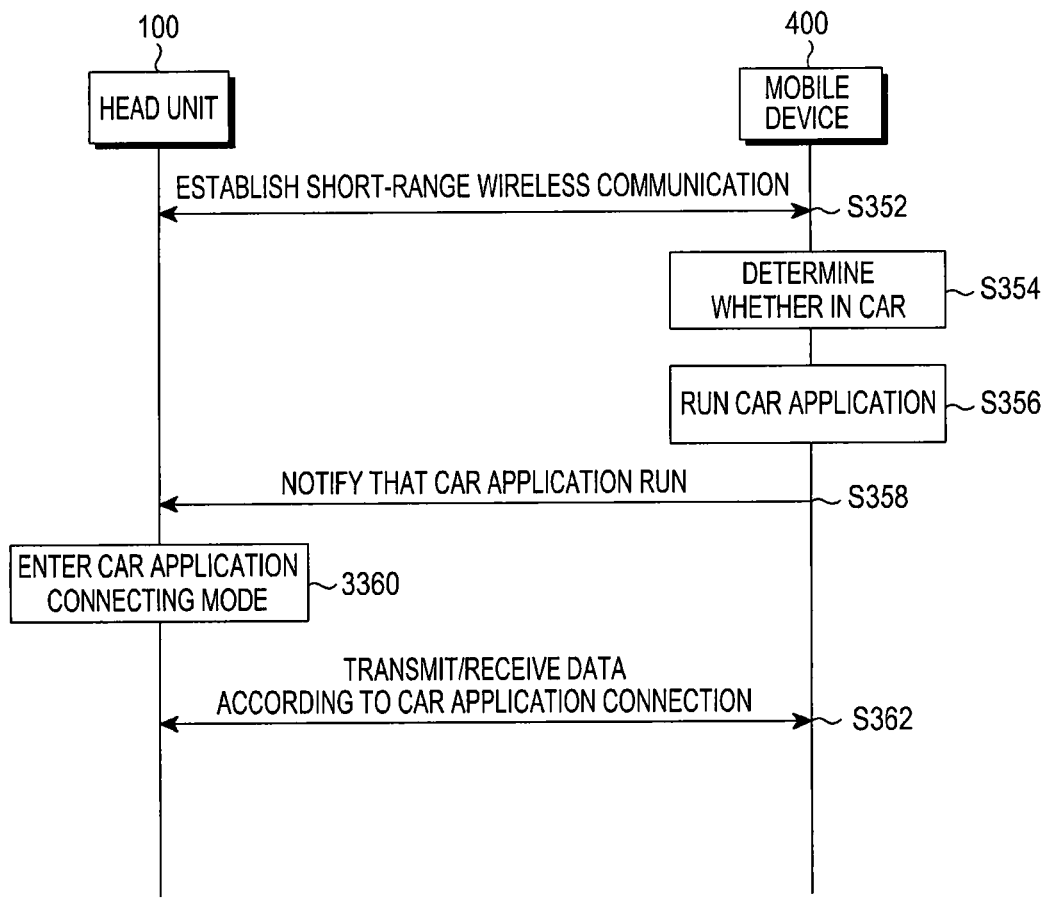
FIG. 3 illustrates a signal sequence for running a car application between a car's head unit and a mobile device, according to an embodiment of the present invention.

More specifically, FIG. 3 illustrates a signal sequence of running a car application between the car's head unit 100 and the mobile device 400, according to an embodiment of the present invention. Referring to FIG. 3, in step S352, the mobile device 400 establishes a connection with the head unit 100 for short-range wireless communication, automatically or at the user's request when the mobile device 400 moves into the car.

With the establishment of the short-range wireless communication, the mobile device 400 determines, in step S354, whether it is located in the car.

The mobile device 400 may determine whether it is located in the car by identifying company information included in a short-range wireless communication signal from a short-range wireless communication device, using OBD interface detection, or determining whether a MAP protocol is used in Bluetooth communication. How to determine whether the mobile device 400 is located in the car using short-range wireless communication will be described in more detail below in connection with FIGS. 4 to 6.

Figure 4:
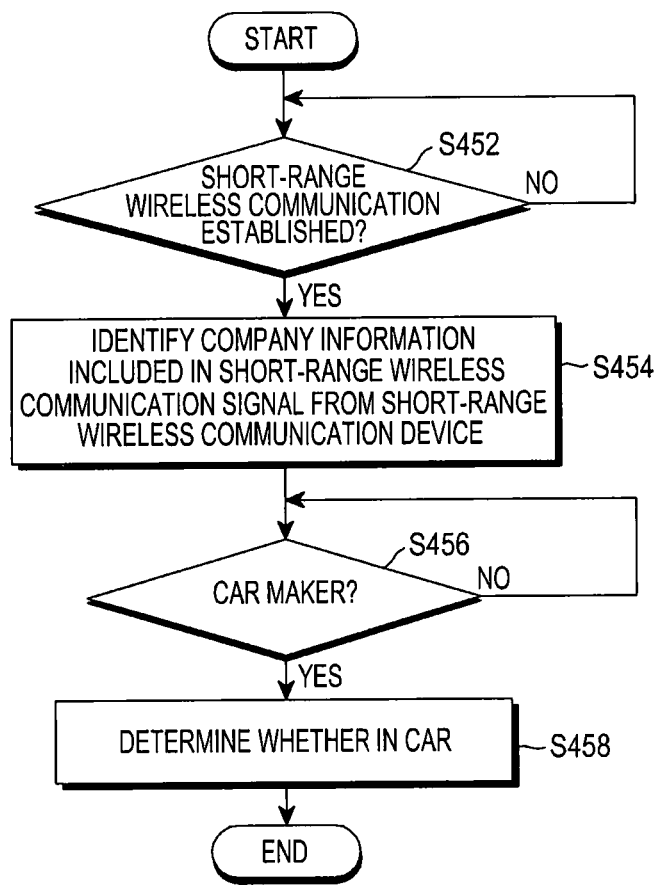
FIG. 4 is a flowchart illustrating operations of running a car application in the mobile device using a Media Access Control address (MAC address) of a short-range wireless communication device, according to an embodiment of the present invention.

FIG. 4 is a flowchart illustrating operations of running a car application in the mobile device 400 using a Media Access Control (MAC) address of a short-range wireless communication device, according to an embodiment of the present invention. Referring to FIG. 4, in step S452, the mobile device 400 determines whether short-range wireless communication, e.g., Bluetooth communication or Wi-Fi communication, is established between the mobile device 400 and the head unit 100. If short-range communication is established, the mobile device 400 identifies, in step S454, company information included in a short-range wireless communication signal from a short-range communication device, e.g., the head unit 100. Specifically, the mobile device 400 determines, in step S456, if a company ID of a MAC address or Bluetooth (BT) address included in a Wi-Fi communication signal or Bluetooth communication signal, respectively, is a car manufacturer when the Wi-Fi communication is established. In step S458, the mobile device 400 determines that it is located in the car if the company ID is a car maker.

Figure 5:
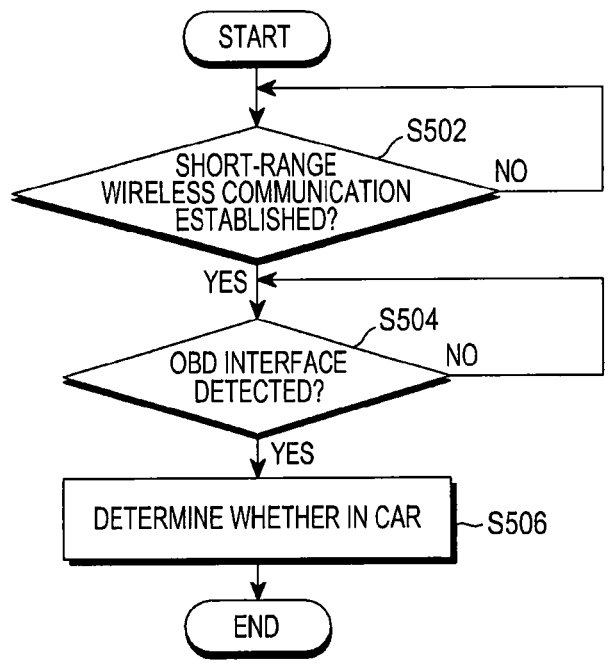
FIG. 5 is a flowchart illustrating operations of running a car application in a mobile device using On-Board Diagnostics (OBD) interface detection, according to an embodiment of the present invention.

FIG. 5 is a flowchart illustrating operations of running a car application in a mobile device using OBD interface detection, according to an embodiment of the present invention. Referring to FIG. 5, the mobile device 400 determines, in step S502, whether a short-range wireless communication, e.g., Bluetooth communication or Wi-Fi communication, is established between the mobile device 400 and the head unit 100. If the short-range wireless communication is established, the mobile device 400 determines, in step S504, whether the head unit 100 uses or supports the OBD interface through the short-range wireless communication. If the head unit 100 uses or supports the OBD interface, the mobile device 400 determines, in step S506, that the mobile device 400 is located in the car.

Figure 6:
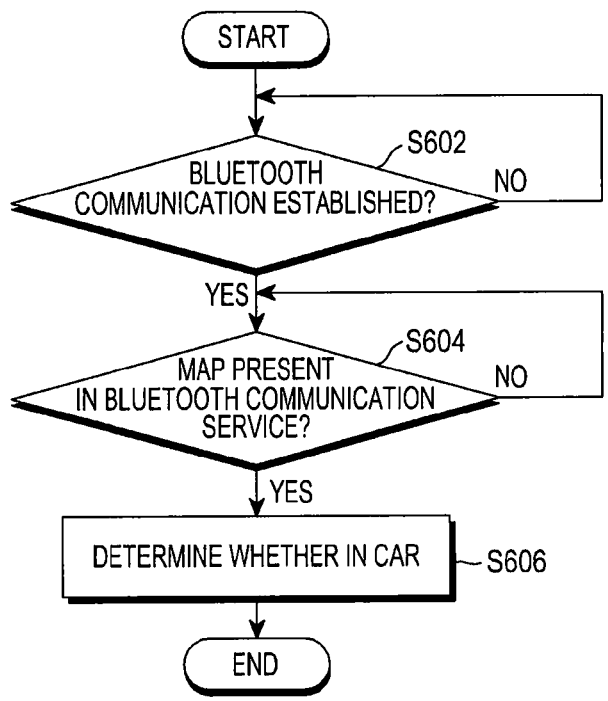
FIG. 6 is a flowchart illustrating operations of running a car application in a mobile device based on whether Message Access Profile (MAP) is used in the Bluetooth communication, according to an embodiment of the present invention.

FIG. 6 is a flowchart illustrating operations of running a car application in a mobile device based on whether Message Access Profile (MAP) is used in the Bluetooth communication, according to an embodiment of the present invention. Referring to FIG. 6, the mobile device 400 determines, in step S602, whether the Bluetooth communication has been established with the head unit 100. If the Bluetooth communication has been established, the mobile device 400 determines, in step S604, whether a MAP service is present while in the Bluetooth communication service. The MAP service is more likely to be provided only in cars. Accordingly, in step S606, the mobile device 400 determines that it is located in the car if the MAP service is present while in the Bluetooth service.

Referring back to FIG. 3, in step S356 the mobile device 400 runs a predetermined car application in step S356 if it has determined that it is located in the car in step S354. In step S358, and the mobile device 400 notifies the head unit 100 that the car application is running. The car application may be e.g., a drive link application. The drive link application carries out functions such as, for example, playing music, accessing GPS navigation, and making hands-free calls while the user is driving the car. However, the present invention is not limited to the drive link application, and in other embodiments, any applications capable of being associated between a car and a mobile device, having functions such as, for example, sending messages, providing road information, television functions, etc. may also be used.

In step S360, the head unit 100 enters a car application connecting mode as the car application runs. In step S362, the head unit 100 transmits or receives from the mobile device 400 data required to perform functions of the car application. In this case, the head unit 100 forwards car information, which is obtained as a result of performing respective functions of the car and is provided from ECUs 202, 204, and 206 as well as the OBD 210, to the mobile device 400 for use in performing functions of the car application.

Although the mobile device 400 runs the car application based on the short-range wireless communication signal, in other embodiments the mobile device 400 may alternatively run the car application when a wireless charging event occurs. The charging event may include, for example, commencement of a charging of the mobile device 400 or interruption of an existing charging process.

Figure 7:
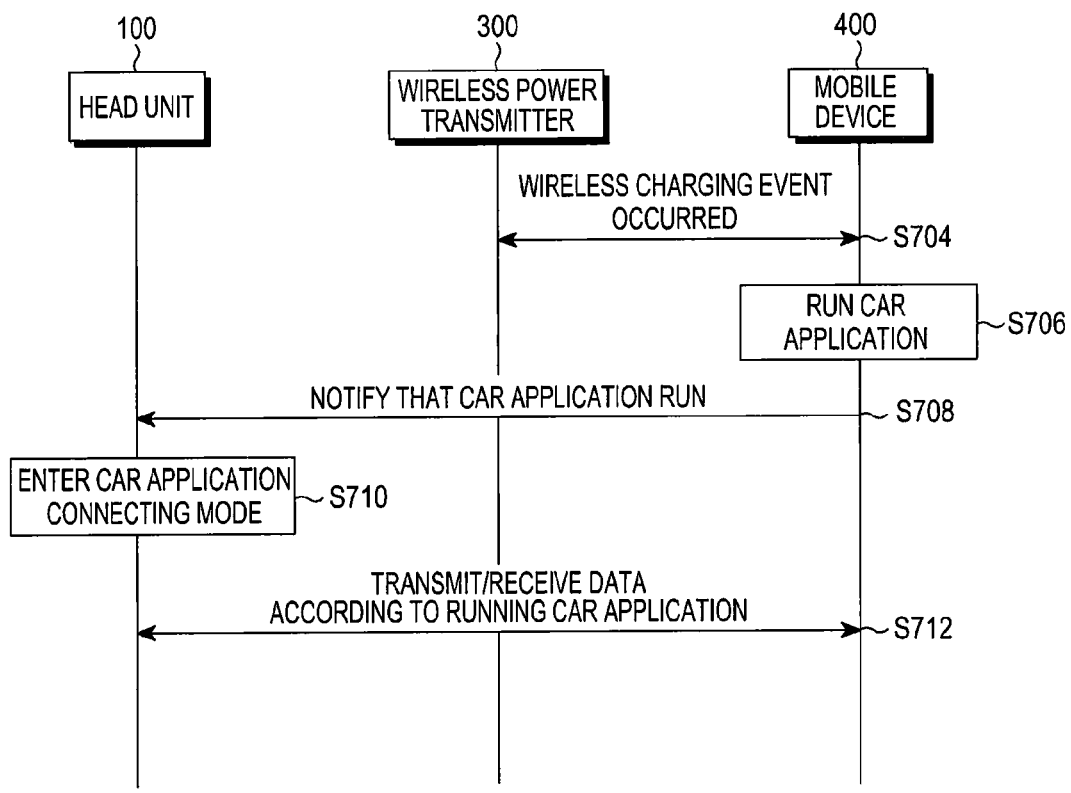
FIG. 7 illustrates a signal sequence of running a car application among a car's head unit, a wireless power transmitter, and a mobile device, according to an embodiment of the present invention.

More specifically, FIG. 7 illustrates a signal sequence of running a car application among the car's head unit 100, the wireless power transmitter 300, and the mobile device 400, according to an embodiment of the present invention. Referring to FIG. 7, if, in step S704, the mobile device 400 is placed on the wireless power transmitter 300 in the car or if a wireless charging event occurs automatically or at the user's request, the mobile device 400 determines that it is located in the car and, in step S706, runs a predetermined car application. In step S708, the mobile device 400 notifies the head unit 100 that the car application is running. The car application may be e.g., a drive link application. The drive link application carries out functions such as, for example, playing music, accessing GPS navigation, and making hands-free calls while the user is driving the car. However, the present invention is not limited to the drive link application, and in other embodiments, any applications capable of being associated between a car and a mobile device, performing functions such as, for example, sending messages, providing road information, television functions, etc. may also be used.

In step S710, the head unit 100 enters a car application connecting mode while the car application runs, and transmits to or receives from the mobile device 400 data required in terms of performing functions of the car application in step S712. In this case, the head unit 100 forwards car information, which is obtained as a result of performing respective functions of the car and is provided from ECUs 202, 204, and 206 and the OBCD 210, to the mobile device 400 to be used in performing functions of the car application.

In another embodiment, if the wireless charging event occurs, the mobile device 400 may determine whether short-range wireless communication has been established and, if it has, determine if the mobile device 400 is located in the car using a short-range wireless communication signal. If the mobile device 400 is located in the car, the mobile device 400 runs a car application.

Figure 8:
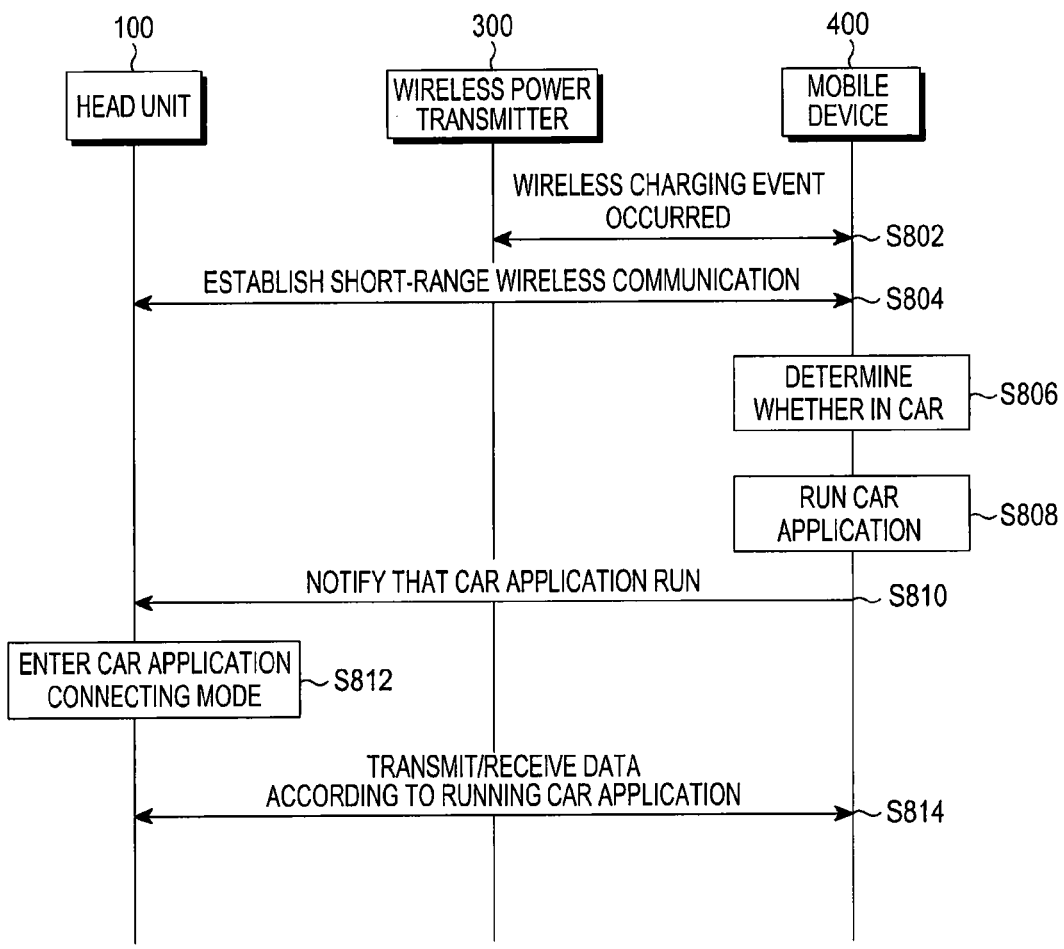
FIG. 8 illustrates a signal sequence of running a car application among a car's head unit, a wireless power transmitter, and a mobile device, according to another embodiment of the present invention.

FIG. 8 illustrates a signal sequence of running a car application among the car's head unit 100, the wireless power transmitter 300, and the mobile device 400, according to an embodiment of the present invention. Referring to FIG. 8, if the mobile device 400 is placed on the wireless power transmitter 300 in the car, or if a wireless charging event occurs automatically or at the user's request, the mobile device 400 determines, in step S802, whether short-range wireless communication has been established. If short-range wireless communication has been established in step S804, the mobile device determines, in step S806, whether it is located in the car.

The mobile device 400 may determine whether it is located in the car by identifying company information included in the short-range wireless communication signal from a short-range wireless communication device, using OBD interface detection, or determining whether a MAP protocol is used in Bluetooth communication. How to determine whether the mobile device 400 is located in the car using short-range wireless communication has been described above in connection with FIGS. 4 to 6.

Having determined that it is located in the car, the mobile device 400 runs, in step S808, a predetermined car application. Subsequently, in step S810, the mobile device 400 notifies the head unit 100 that the car application is running. The car application may be e.g., a drive link application. The drive link application performs functions such as, for example, playing music, accessing GPS navigation, and making hands-free calls while the user is driving the car. However, the present invention is not limited to the drive link application, and in other embodiments, any applications capable of being associated between a car and a mobile device, performing functions such as, for example, sending messages, providing road information, television functions, etc. may also be used.

In step S812, the head unit 100 enters car the application connecting mode as the car application runs, and, in step S814, transmits to or receives from the mobile device 400 data required to perform functions of the car application. In this case, the head unit 100 forwards car information, which is obtained as a result of performing respective functions of the car and is provided from ECUs 202, 204, and 206 and the OBCD 210, to the mobile device 400 to be used in performing functions of the car application.

According to the embodiments of the present invention, with communication established between the car and the mobile device, the mobile device runs the car application automatically by determining whether the mobile device is located in the car, without the need for the user's command or manipulation to run the car application, thereby increasing user convenience. In addition, as wireless charging begins between the car and the mobile device, the mobile device determines whether it is located in the car and runs the car application, thereby allowing the user to use the car application more easily.

Several embodiments have thus been described, but it will be understood that various modifications can be made without departing the scope of the present invention. Thus, it will be apparent to those ordinary skilled in the art that the invention is not limited to the embodiments described, but can encompass the appended claims and their equivalents.

What is claimed is:

1. A method of running a car application connected to a mobile device, the method comprising:
    determining whether a wireless charging event occurs in the car, wherein the wireless charging event occurs automatically or at a user's request, the mobile device determined whether a short-range wireless communication is established, and the mobile device is placed on a wireless power transmitter in the car for
    identifying information received from a short-range wireless communication device to support by an On-Board Diagnostics (OBD) interface the wireless charging event that occurs; and
    running at least one application automatically which is associated between the car and the mobile device, which is related to the car if the identified information includes information from the mobile device that is related to the car.

2. The method of claim 1, further comprising:
    determining that the mobile device is located in the car if the identified information includes company information corresponding to a car manufacturer.

3. The method of claim 1, wherein the short-range wireless communication unit transmits a short-range wireless communication signal, wherein the short-range wireless communication signal comprises at least one of a Bluetooth communication signal and a Wireless Fidelity (Wi-Fi) communication signal.

4. The method of claim 3, further comprising:
    determining whether Message Access Profile (MAP) is used in Bluetooth communication with the mobile device; and
    determining that the mobile device is located in the car if the MAP is used.

5. The method of claim 1, further comprising:
    detecting an On-Board Diagnostics (OBD) interface through short-range communication with the mobile device; and
    determining that the mobile device is located in the car if the OBD interface is detected.

6. The method of claim 1, wherein the wireless charging event includes one of a commencement of a charging of the mobile device and an interruption of an existing charging process.

7. A mobile device, comprising:
    a wireless power receiver configured to wirelessly receive power to perform wireless charging in a car, wherein the wireless charging event occurs automatically or at a user's request, the mobile device determined whether a short-range wireless communication is established, and the mobile device is placed on a wireless power transmitter in the car for identifying information received from a short-range wireless communication device to support by an On-Board Diagnostics (OBD) interface the wireless charging event that occurs;
    a short-range wireless communication unit configured to perform short-range wireless communication with a head unit of the car and to receive information from the head unit; and
    a controller configured to identify information received from the short-range wireless communication unit when a wireless charging event occurs and to run at least one application automatically which is associated between the car and the mobile device, which is related to the car if the identified information includes information from the mobile device that is related to the car.

8. The mobile device of claim 7, wherein the controller is further configured to determine that the mobile device is located in the car if the identified information includes company information corresponding to a car manufacturer.

9. The mobile device of claim 7, wherein the short-range wireless communication unit comprises at least one of a Bluetooth communication unit and a Wi-Fi communication unit.

10. The mobile device of claim 9, wherein the controller is further configured to determine that the mobile device is located in the car if Mobile Access Profile (MAP) is used in Bluetooth communication between the mobile device and the head unit.

11. The mobile device of claim 7, wherein the controller is further configured to determine that the mobile device is located in the car if an OBD interface is detected through short-range wireless communication with the head unit.

12. The mobile device of claim 7, wherein the wireless charging event includes one of a commencement of a charging of the mobile device and an interruption of an existing charging process.

* * * * *